UNITED STATES PATENT OFFICE.

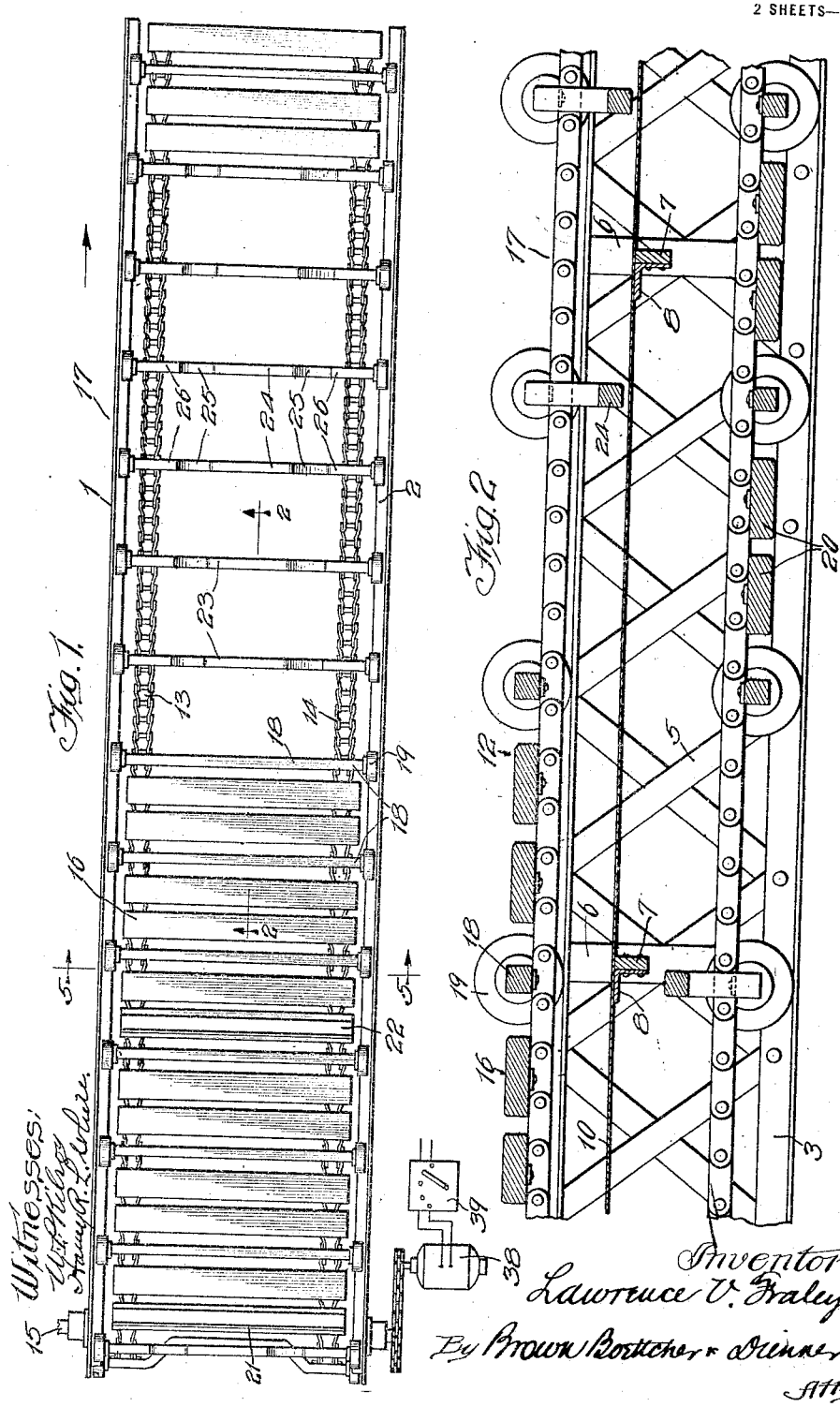

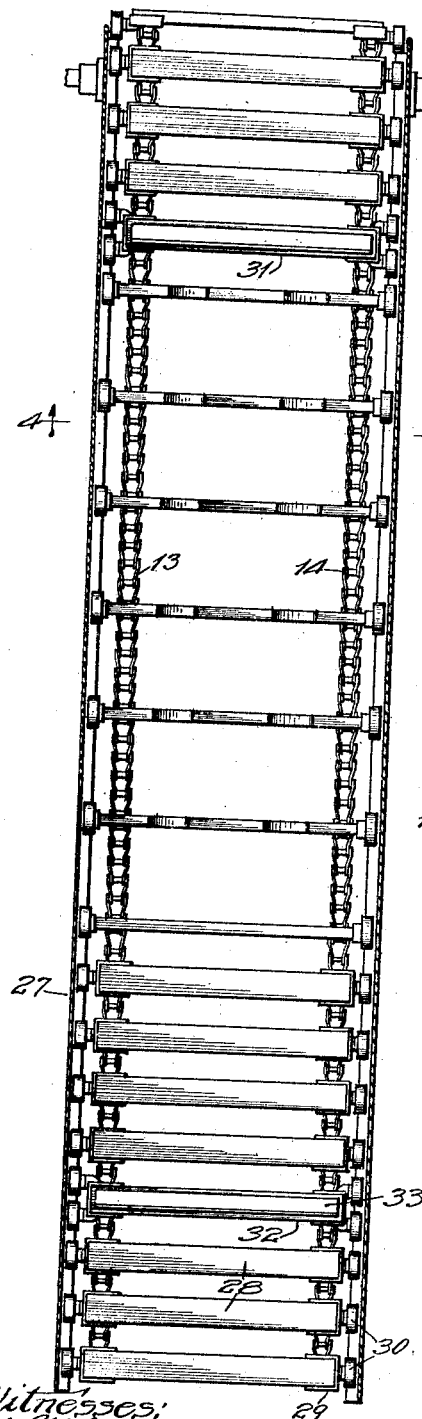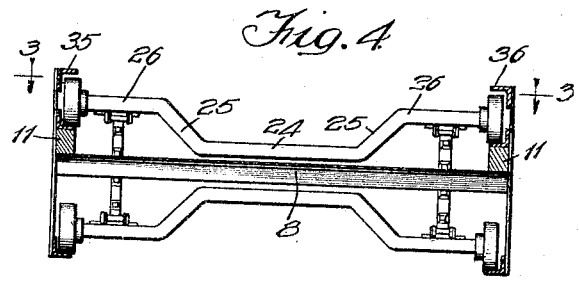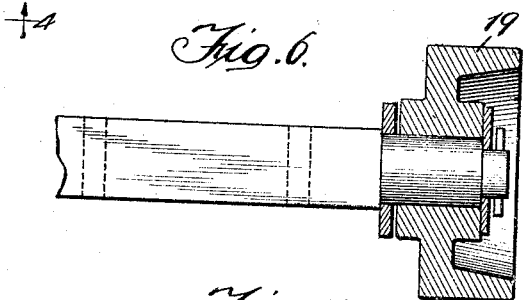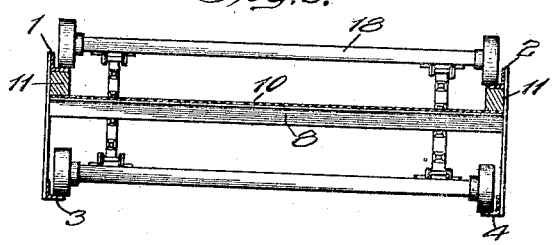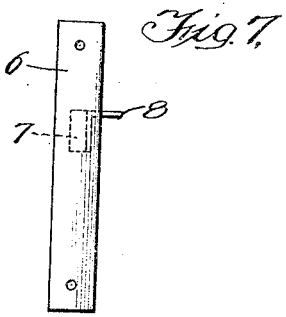

LAWRENCE V. FRALEY, OF CHICAGO, ILLINOIS, ASSIGNOR TO BROWN PORTABLE CONVEYING MACHINERY COMPANY, OF CHICAGO, ILLINOIS, A CORPORATION OF ILLINOIS.

CONVEYER.

1,366,780.  Specification of Letters Patent.  Patented Jan. 25, 1921.

Application filed May 1, 1919. Serial No. 294,012.

*To all whom it may concern:*

Be it known that I, LAWRENCE V. FRALEY, a citizen of the United States, residing at Chicago, in the county of Cook and State of Illinois, have invented a certain new and useful Improvement in Conveyers, of which the following is a full, clear, concise, and exact description, reference being had to the accompanying drawings, forming a part of this specification.

My invention relates to conveying machinery and particularly to the carriage or moving web for the same.

Where the conveying machine is employed to convey or transport only one kind of package or commodity the problem is relatively simple as the carriage or web can be devised to fit the particular requirements to a nicety. If mixed commodities are to be conveyed the problem is difficult. For instance, assume that barrels of flour and bags of flour are to be conveyed by the same machine. If a flat carriage or apron be provided the barrels would roll off and if a drop axle carriage be provided the bags would tend to fall down between the axles.

My invention aims to provide a conveyer carriage suitable for the handling of mixed commodities individually or simultaneously.

I have observed that in handling commodities, one man, or a gang of men working together, cannot load the commodities faster than a given rate. For instance, barrels of flour cannot conveniently be loaded faster by one man alone or two men working together as a gang than at the rate of one barrel per thirty seconds. But obviously the conveyer carriage may be run much faster than one barrel length per thirty seconds. In fact, if two separate men or gangs of men alternated in loading the conveyer carriage the conveyer could easily take care of such loading.

My invention aims to take advantage of this ability of the conveyer to carry faster than loading can be accomplished.

I make one portion of the carriage of such a character as to be adapted to handle one kind of commodity and another portion of the carriage adapted to handle a different kind, etc., all operating in tandem or alternating.

Thus, for instance, if bags and barrels are to be handled by the same machine, I employ a carriage comprising a drop axle section suitable for handling barrels and an apron section suitable for handling bags, these sections alternating throughout the length of the carriage. Thus two classes of commodities may be properly handled either separately or simultaneously. For simultaneous handling two gangs of loaders may alternately load barrels and bags, the running of the carriage being synchronized with the working of the gangs so that a proper section presents itself at the time that the particular commodity is loaded. To this end the speed of the carriage is synchronized with the movements of the gang or gangs of loaders so that when a commodity is in position to be loaded the proper carriage section presents itself. The same is true whether only one commodity is being handled or whether two or more are being handled. I term the carriage of this type a tandem carriage.

In order to acquaint those skilled in the art with the manner of best constructing and operating my invention I shall now describe the same in connection with the accompanying drawings.

Figure 1 is a plan view of a portion of a conveyer and carriage embodying my invention;

Fig. 2 is a sectional view taken on the line 2—2 of Fig. 1;

Fig. 3 is a view similar to Fig. 1 showing a modified form of device, this view being taken substantially on the line 3—3 of Fig. 4;

Fig. 4 is a sectional view taken on the line 4—4 of Fig. 3;

Fig. 5 is a cross section taken on the line 5—5 of Fig. 1;

Fig. 6 is an enlarged detail view of the end of an axle and a roller therefor; and Fig. 7 is an elevational view of one of the struts shown in Fig. 2.

The conveyer arm upon which the carriage runs is preferably formed of longitudinal angle bars 1, 2, 3 and 4 (see Figs. 1, 2, 3 and 5) connected together at the sides by suitable straps of bar iron 5 formed in the shape of a lattice work as shown in Fig. 2. The upper and lower angle bars on each side are also connected by struts 6 shown more clearly in Figs. 2 and 7. These struts have projecting lugs or studs 7 extending inwardly; these studs or lugs being connected together by means of angle bars 8 as shown in Figs. 2 and 7.

A sheet metal floor or bottom 10 is mounted upon the transverse angles 8 and is secured to the horizontal flanges of the same to form a smooth continuous bottom for the conveyer arm. Spacing blocks or strips 11 may be placed between the horizontal flanges of the angle bars 1 and 2 and the sheet metal bottom 10.

The carriage 12 comprises two chains 13 and 14 which are trained over suitable sprockets at the ends of the conveyer arm, these sprockets being mounted upon shafts such as 15, shown in Fig. 1. As shown in Figs. 1 and 2 the carriage 12 comprises two types of sections, namely the apron section 16 and the drop axle section 17. The apron section comprises a series of straight square shafts 18 having rollers 19 upon the ends thereof, these rollers running in the tracks formed by the angle bars 1, 2, 3 and 4. The axles 18 are connected to the chains 13 and 14, the chains having suitable wing links for making such attachments, as is clearly shown in Fig. 2, and Fig. 5. Between the axles 18 are placed the apron slats 20, these slats being also mounted upon suitable links of the chains 13 and 14. Certain ones of the slats as shown by reference numerals 21 and 22 in Fig. 1, are provided with angle iron cleats for preventing the slippage of articles placed upon the apron. These cleats are preferably formed of bars of angle iron having a horizontal leg fitting flat against the top surface of the slats and a vertical leg projecting upward and forming an abutting surface for preventing the slippage of an article on the apron. Preferably the section which is formed of the slats, namely the apron section, has two of these cleats, one at the end of the apron section and one at the middle thereof, so that the apron section in reality provides two loading surfaces thereupon.

The drop axle section 17 comprises a series of drop axles 23 which are formed to provide concaved seats or sockets particularly adapted to convey such articles as barrels, drums, rolls and the like which are convex and which would tend to roll off of the flat apron section. In practice I have found it convenient to make the width of the apron substantially 24" with approximately 28½" between the edges of the angle bars 1 and 2 with each section, namely the apron section and the drop axle section being made of a length of about 5 ft. With these proportions the drop axles are spaced about 10" apart. The above dimensions are merely illustrative of the invention and are not intended as limiting in any manner.

The drop axles are formed of a central or drop portion 24 joined by diagonal portions 25 to the straight portions 26. The straight portions have at their ends the rollers 19, one of which rollers is shown in enlarged cross section in Fig. 6. The links of the chains 13 and 14 are connected to the straight portions 26.

I have shown a modified form of apron section in Figs. 3 and 4. In this form the drop axle section is the same as that illustrated in Figs. 1 and 2. The apron section 27 differs in that the individual apron slats 28 are provided with gudgeons 29 at the ends thereof, these gudgeons having sockets or saddle portions for receiving the ends of the slats and having axle portions for mounting the rollers 30. The slats and gudgeons are secured together upon the chains 13 and 14 by suitable rivets as disclosed in my co-pending application, Serial Number 290,962 filed April 18, 1919. The particular slats 31 and 32 which are placed at the end and in the center of the apron section respectively are provided with angle iron cleats 33 for preventing slippage of the commodities upon the apron. These particular slats 31 and 32 are provided with gudgeons having double axles for preventing tilting of the slats by such brackets. For this purpose the conveyer arm is provided with the top angle bars 35 and 36 which hold the double rollers in a channel to prevent tilting of the connected slats. The particular features of this form of apron are disclosed in my above mentioned co-pending application and do not form a part of the present invention.

In operation the articles to be loaded are deposited upon the carriage at a given rate. The conveyer carriage is run at such a speed as to bring the proper sections simultaneously under the point of loading. Thus for instance, if bags are being loaded upon the conveyer, the bags are deposited at intervals which coincide with the appearance of the apron section. On the contrary if barrels, drums or cylinders are being conveyed, they are loaded at periods coinciding with the appearance of the drop axle sections. If mixed commodities are simultaneously handled, each commodity is loaded at a period coinciding with the the appearance of the appropriate carrier section.

In order to bring about synchronism between the periodical loading and the appearance of the appropriate carriage section I provide means for controlling the speed of the carriage. In the present instance the driving motor 38 is suitably controlled by the regulator 39 to bring about the desired synchronism.

It is not intended that the invention be limited to the precise forms of carriage shown and described, as the invention is broader than the particular embodiments which have been shown. Instead of employing the particular drop axle section, any other form suitable for conveying convex objects such as drums, barrels, rolls and the like might be provided.

In a similar manner any other form of apron might be provided, or instead of a flat surface, any other suitable surface may be provided, depending upon the type of commodity to be conveyed.

I claim:

1. In combination, a conveyer arm and a carriage traveling on said arm, said carriage comprising a drop axle section and an apron section in tandem.

2. In combination, a conveyer arm and a carriage traveling on said arm, said carriage comprising a pair of continuous chains, means connected to said chains for providing a concave seat for a commodity and alternate means secured to said chains providing a relatively flat surface for a commodity of a different class.

3. In combination, a conveyer arm having sprockets at the ends thereof, chains trained over said sprockets, a plurality of drop axles secured to said chains, said axles having straight portions adjacent their ends attached to said chains, rollers on said axles riding on the arm, a plurality of slats secured to said chains for providing a relatively flat conveyer surface and means for driving said chains at a predetermined speed.

4. In combination, a conveyer arm having a plurality of angle bars forming tracks, a carriage having axles, said axles having rollers running upon said tracks, said angle bars being connected together in pairs at each side by diagonal connections, struts connected between said angles, said struts having integral lugs and angle bars secured at their ends to said lugs connecting the struts to hold said pairs of angles in proper spaced relation and a sheet metal floor supported on said latter angle bars.

5. In combination, a conveyer arm and a carriage traveling on said arm, said carriage comprising a drop axle section and an apron section, means for driving said carriage at a speed suitable for loading.

6. In combination, a conveyer arm and a carriage traveling on said arm, said carriage comprising an apron section and a drop axle section, means for driving said carriage, and means for varying the speed of said driving means.

7. In combination, a conveyer arm, a carriage traveling on said arm having a plurality of sections for receiving different commodities, and means for varying the speed of the carriage to synchronously present the appropriate carriage surface to receive the commodities in order.

In witness whereof, I hereunto subscribe my name this 29 day of April, A. D. 1919.

LAWRENCE V. FRALEY.